//ˀ

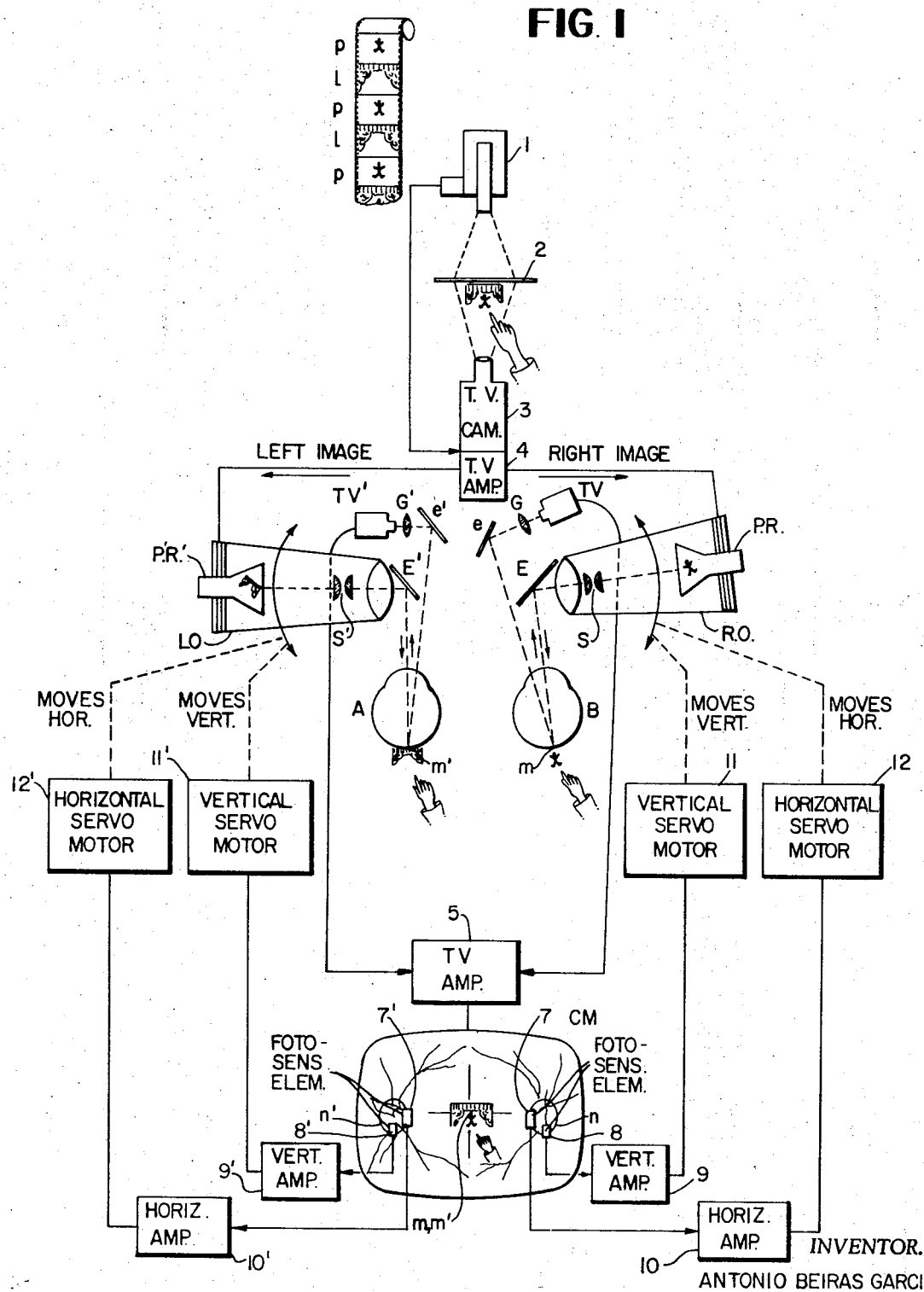
FIG. I

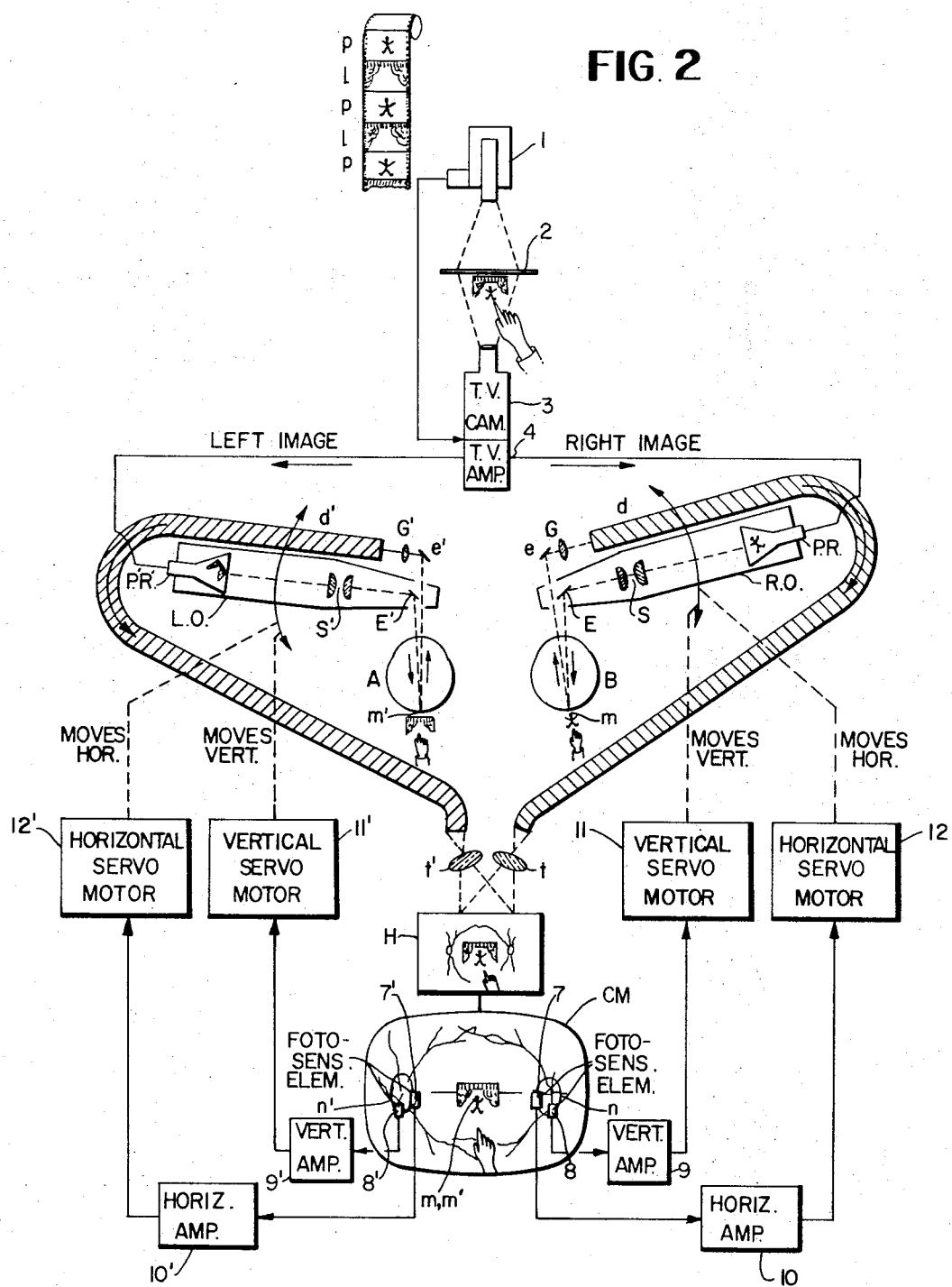

United States Patent Office 3,544,203
Patented Dec. 1, 1970

3,544,203
APPARATUS FOR TESTING STRABISMUS
Antonio Beiras Garcia, deceased, late of Vigo, Spain, by Antia Cal Vazquez, administratrix, Calle Policarpo Sanz 22, Vigo, Spain
Continuation-in-part of application Ser. No. 328,948, Dec. 9, 1963. This application Dec. 6, 1968, Ser. No. 782,007
Int. Cl. A61b 3/00, 3/12
U.S. Cl. 351—2                                       3 Claims

ABSTRACT OF THE DISCLOSURE

An apparatus for testing strabismus comprising means for displaying a scene so that the display may be touched by a patient and for producing two complementary images each representing a part of the displayed scene. Two ophthalmoscopic arrangements are disposed to transmit different ones of said images to different eyes of a patient and to allow examination of the images formed on the respective fundi of the patient's eyes, said ophthalmoscopic arrangements being relatively movable to enable the two ophthalmoscopic arrangements to be aligned on the respective optical axes of the patient's eyes.

---

This application is a continuation-in-part of application Ser. No. 328,948, now abandoned, filed Dec. 9, 1963 by Antonio Beiras Garcia, entitled Apparatus for Treating Strabismus.

The present invention relates to apparatus for testing strabismus.

When a normal individual looks at an object he points the optical axis of each eye to the object. He receives two sensations—one for each eye—which he sends to the brain where a coordination-operation is performed; the two sensations are converted into a single response. Of course the two images received by the eyes are similar, but nonetheless slightly different. The similarity helps the coordination; the differences give the position and distance of the object. The brain fuses the two images received at the eyes and in this operation a correspondence is established between like points of the eyes, the most important of them being the points which correspond to the intersection of the visual axis with the retina in each eye. The area on and around this point is called the fovea, and is the most sensitive part of the retina. It is on the surroundings of the foveas where the received images are most alike. Away from the foveas the images differ. A normal individual always fuses the images from the foveas and the near surrounding area; and uses the differences between the images of the outer areas of the eyes to appreciate distance and stereoscopy.

Strabismus is the loss of coordination of the images at the foveas. The brain is not able to fuse the images and the individual sees two images. The reaction to the double image is to suppress one by inhibition. Frequently in this case the sensitivity of the fovea of the inhibited eye is lost.

Correction of strabismus aims at restoring the coordination and fusion of the images. Two steps are important: one is to restore the sensitivity of the fovea on the lazy eye, and this is done by stimulation of the lazy eye: the other is to restore the coordination by simultaneous stimulation of both eyes with complementary images, so the complete image could be seen only when properly fused.

So far, the apparatus in use to correct strabismus, conventional synoptophore, has two faults. First, when introducing an image into the eye for stimulation and restoration of the fovea, there is no way of ensuring that the image is projected along the axis of the eye. Second, when trying to effect coordination there is a lack of tactile sensation to help in restoring the fusion of the images. It is believed that the most important sense in aiding the restoration of fusion is tactile sense. In this way in conventional synoptophores it was impossible for the patient to touch the test object at which he was looking, and simultaneously see his own hand doing it. It is believed that this simultaneous use of the sense of touch in treatment of strabismus is of great importance especially in the case of babies who rely to a considerable extent on their sense of touch.

According to the present invention there is provided apparatus for testing strabismus comprising means for displaying a scene so that the display may be touched by a patient and for producing two complementary images each representing a part of the displayed scene. Two ophthalmoscopic arrangements are disposed to transmit different ones of said images to different eyes of a patient and to allow examination of the images formed on the respective fundi of the patient's eyes, said ophthalmoscopic arrangements being relatively movable to enable the two ophthalmoscopic arrangements to be aligned on the respective optical axes of the patient's eyes.

For a better understanding of the present invention and to show how the same may be carried into effect, preferred embodiments thereof will be described with reference to the accompanying drawings in which:

FIG. 1 shows diagrammatically a first embodiment of the invention and

FIG. 2 shows a modification of the embodiment of FIG. 1.

(1) An image-generating section for producing images of a scene or object (by means of a cinematographic picture, for instance, produced on a screen) and for projecting the images onto the eye fundus.

(2) A section for examining the back of the eyes (eye fundus) and providing a display thereof which enables a doctor to check the position of the test image on eye fundus. Therefore, he knows when the image is on the fovea.

(3) A servo section which responds to the display above-mentioned to maintain the test image constantly on the fovea, in spite of eye movements.

Referring now to FIG. 1 of the drawings, section 1 comprises a cinema projector for projecting images onto a movie screen 2, at which a TV camera 3 is directed through a mirror, so the TV camera could be placed vertically upstairs, letting room for the patient to touch the movie screen. The image representing electrical signals from the camera 3 are fed to two electronic ophthalmoscopes LO and RO. The projector 1 is loaded with a special film which carries alternate images (l, r, l, r, l . . .) each representing a part of a complete test scene. The part images l and r are to be received separately by each eye of a patient indicated by A and B, the eyes A and B having images directed thereto through the ophthalmoscopes LO and RO respectively. In order that the images l and r go to only eyes A and B respectively, synchronizing signals are derived from the projector 1 to gate and video signals from the camera 3 to the appropriate ophthalmoscope, such gating being effected in a video amplifier 4.

Referring in particular to the electronic ophthalmoscopes LO and RO each is basically similar to a manually-operable conventional ophthalmoscope, and has the usual optical system based on lenses, prisms and mirrors to project images into and receive images out of the eye. Instead of the usual luminous point (light source) a luminous image is used and as shown, this image is formed on a TV picture indicated by references PR and PR'. It has been mounted as an amblyoscopic tube, like those used on conventional synoptophores. The lenses S and S' of ophthalmoscopes RO and LO enable focusing of the test images on the eye fundus. The optical system further includes mirrors or prisms E and E' for transmitting images to the eyes. The ophthalmoscopes further include lenses and mirrors S, S' and G–G' for taking images from the back of the eyes and this part of the apparatus will now be described.

It has been described how to introduce images to be seen by the patient onto the eye fundus. The projected image on the eye fundus is seen by the doctor through the ophthalmoscopes observation system. It is possible to carry out treatment for strabismus by having a doctor manipulate each ophthalmoscope to maintain the image transmitted thereby on the fovea. However, it is preferable to display the images from both eyes on a common monitor and having done this to have a servo loop operable from the monitor display to maintain the ophthalmoscopes in alignment with the optical axes of the eyes.

Instead of having the doctor's eye looking directly into the ophthalmoscope, the apparatus of FIG. 1 further comprises a respective television camera TV, TV' mounted on each ophthalmoscope to pick up the scene images $l$ and $r$ respectively superimposed on the eye fundus. The images of the eye fundus and introduced test images are transmitted from the patient's eyes by the mirrors or prisms $e$ and $e'$ and lenses G–G' already mentioned.

The electrical signals from the cameras TV and TV' are combined in an amplifier 5 which in turn drives a further picture tube referred to as the common monitor CM in addition to the $l$ and $r$ pictures superimposed, the two optical nerves are represented on the common monitor CM, being at the left the optical disc and veins $n'$ of the left eye and at the right the optical disc and veins $n$ of the right eye.

If the optical axis of each ophthalmoscope is centered on the associated fovea $(m, m')$ both maculae will be superimposed on the center of the monitor CM.

If it is now assumed that the patient's left eye is twisted—to the left say—to an observing doctor, the $l$ and $r$ images at the center, and the optical disc image of the right eye at the right $n$ do not change. But the left optical disc $n'$ and the veins of the left eye move as much as the left eye is twisted. That amount the optical disc moves is proportional to the angle twisted and will allow to know whether the $l$ picture is or not on the fovea. (Foveas $m$ and $m'$ at this moment are not superimposed.) The results would be similar if the right eye were twisted.

It has so far been described how images are transmitted to the patient's eyes and further how images of the back of the eyes are presented on a common monitor for viewing by a doctor. There will now be described the third section of the preferred apparatus which maintains the film images on the foveas. This control is performed by independent electric mechanisms which move the positions of the ophthalmoscopes so as to follow the movements of the patient's eyes and maintain the ophthalmoscopes aligned with the optical axes of the eyes. The two ophthalmoscopes move independently, and each one is mounted so as to have two movements, horizontal and vertical.

The servo loop for the ophthalmoscope RO comprises a pair of photo-cells 7 and 8 located to overlap the vertical and horizontal edges of the optical disc $n$ of the right eye as displayed on the monitor CM. The signals from photocells 7 and 8 represent the vertical and horizontal position of the right optical disc. These signals are amplified in amplifiers 9 and 10 which supply signals to drive servo-motors 11 and 12 which mechanically drive the ophthalmoscope RO. A similar arrangement is used for the left ophthalmoscope and like parts are denoted by the same reference numerals as for the right hand side with the addition of a prime.

When an eye moves, the displacement signal for the associated ophthalmoscope is obtained for the common monitor CM, the movement of one eye resulting in the movement of the corresponding image of the optical disc at the monitor CM. The image of the optical disc is a very nitid white circle, and being so, its position on the monitor CM can be controlled by the servo system through the agency of the two photo-sensitive elements which are initially positioned over the common monitor CM screen by the operator when both eyes and ophthalmoscopes are properly aligned. The two positions for the two photo-sensitive elements for each optical disc are over the white disc border, extending half and half over the white disc and the black fundus. The photo-sensitive elements right angle with respect to the center of the white optical disc.

In this way, each time an eye is moved by the patient the corresponding optical disc image on the monitor CM moves; one or both of the corresponding photo-sensitive elements detects the movement and the corresponding electrical mechanisms (11, 11') moves the associated ophthalmoscope of that eye until the same relative position is again reached between eye and ophthalmoscope, which means that the white optical disc image comes again to the same position on the CM with respect to the photo-sensitive elements.

The three sections of the apparatus of FIG. 1 described above are interconnected or can be handled separately at the doctor's will, but when all parts are working together they are adjusted so that the images $l$ and $r$ projected on the screen 2 have the size and appear to be at a distance from the patient such that a normal individual will have the sensation that the objects he is seeing through the ophthalmoscopes are really at the same distance and in the same direction that the screen 2 actually is, and that the objects he sees are of the size that they actually have on the screen 2. The apparatus is set up so that the patient can touch the screen 2 and confirm using his sense of touch what is projected on the screen. He can also see his hand moving over the screen relative to the picture thereon, his hand appearing in the image sent to each eye thereby aiding in coordinating the eyes.

In summary the described apparatus sets out to achieve the following two primary objects.

(1) That the patient can touch—and see his own hands doing it—the test image that is being used. Conventional synoptophores do not have this feature.

(2) That the doctor can control the point on the eye fundus in which the test is introduced to restore the sensitivity and coordination.

The control system will allow the maintenance of the stimulating image on the fovea in spite of the patient's eyes movements.

Turning now to the apparatus of FIG. 2, the apparatus shown herein is the same as that of FIG. 1 except for the manner in which the images of the back of the eye are transmitted to the common monitor. In FIG. 2, the images from the ophthalmoscopes emergent from lenses $s$ and $s'$ respectively are transmitted not by a television link but by fibre-optic tubes $d$ and $d'$ respectively. The light emergent from the tubes is combined by lenses $t$ and $t'$ to form an image on an orthicon or vidicon pick-up tube H from which signals are sent to the display tube CM. The operation of the apparatus of FIG. 2 is the same as that of FIG. 1.

In this way the object of the apparatus is achieved, since the patient is able to touch the objects on the screen 2 with his hands, while at the same time it is ensured that the images of these objects are formed on the maculae.

I claim:

1. Apparatus for testing strabismus comprising means for displaying a scene so that the display may be touched by a patient and for producing two complementary images each representing a part of the displayed scene; two ophthalmoscopic arrangements disposed to transmit different ones of said images to different eyes of a patient and to allow examination of the images formed on the respective fundi of the patient's eyes; said ophthalmoscopic arrangements being relatively movable to enable the two ophthalmoscopic arrangements to be aligned on the respective optical axes of the patient's eyes wherein said means for displaying a scene and for producing part images thereof comprises a cinematographic projector for projecting a film next adjacent frames of which contain different ones of said images; a television camera directed at said screen and coupled to transmit electrical signals representing the images on the screen to said ophthalmoscopic arrangement; and means coupled to the projector to control the transmission of said electrical signals to the ophthalmoscopic arrangements so that a signal representing a part image is transmitted only to one of said ophthalmoscopic arrangements; and wherein each ophthalmoscopic arrangement includes a television picture tube as a light source, each tube being coupled to display the image-representing electrical signal transmitted to the ophthalmoscopic arrangement; and means for transmitting the images of the fundi of the patient's eyes from the ophthalmoscopic arrangements; means for displaying the fundi images in superimposed relationship; photoelectric means responsive to said images to derive signals representing the deviation of such images from selected positions; and means responsive to said signals to move said ophthalmoscopic arrangements so as to reduce the deviation of the displayed fundi images from their selected positions on the display means.

2. Apparatus according to claim 1, wherein said means for transmitting the fundi images comprising a respective television camera associated with each of said ophthalmoscopic arrangements to convert the fundi images therefrom into corresponding electrical signals and means coupled to each of these two cameras to combine the signals therefrom for application to said means for displaying the fundi images.

3. Apparatus according to claim 1, wherein said means for transmitting the retina images comprises a respective fibre optic light guide associated with each ophthalmoscopic arrangement to transmit the fundus image therefrom and a television camera responsive to both the images from the fibre optic light guides to produce electrical signals representing the combination of the two retina images therefrom, said television camera being coupled to said means for displaying the fundi images.

References Cited
UNITED STATES PATENTS

| | | |
|---|---|---|
| 2,149,148 | 2/1939 | Rones. |
| 2,964,644 | 12/1960 | Hobrough. |
| 3,450,466 | 6/1969 | Streisinger. |
| 3,462,604 | 8/1969 | Mason. |

DAVID SCHONBERG, Primary Examiner

P. A. SACHER, Assistant Examiner

U.S. Cl. X.R.

351—1, 6